United States Patent [19]

Wallace

[11] Patent Number: 4,552,460
[45] Date of Patent: Nov. 12, 1985

[54] BUCKET-LIFT SLURRY STORAGE APPARATUS AND METHOD

[75] Inventor: Norman R. Wallace, Walnut Creek, Calif.

[73] Assignee: Bechtel International Corporation, San Francisco, Calif.

[21] Appl. No.: 537,623

[22] Filed: Sep. 30, 1983

[51] Int. Cl.[4] .......................... B01F 15/02; B01F 7/02
[52] U.S. Cl. .................................. 366/196; 222/369; 366/279; 366/297
[58] Field of Search ............... 366/194, 195, 196, 279, 366/292, 288, 297, 287, 228, 57, 58, 49, 42, 184; 222/369; 68/58

[56] References Cited

U.S. PATENT DOCUMENTS

| | | | |
|---|---|---|---|
| 2,275,887 | 3/1942 | Chandler | 222/369 |
| 2,433,478 | 12/1947 | Nelson | 222/369 |
| 2,504,378 | 4/1950 | Bell | 366/228 |
| 2,934,244 | 4/1960 | Idahl | 222/369 |
| 3,136,660 | 6/1964 | Mueller | 222/369 |

*Primary Examiner*—Robert W. Jenkins
*Attorney, Agent, or Firm*—Townsend and Townsend

[57] ABSTRACT

Apparatus and a method for handling a slurry contained in a tank having a slurry inlet and a slurry outlet. The tank has an open top, and a framework on which a plurality of buckets are mounted is located in the tank for rotation about a central axis through a shaft mounted on the upper margins of the tank. The buckets move along a circular path and into the tank to scoop settled particles on the bottom of the tank and then to lift the particles out of the slurry. In one form of the apparatus, the particles are dropped back into the slurry in the tank to thereby eliminate the growth of settled particles on the bottom of the tank to achieve uniform particle concentrations in the slurry. In another embodiment, the apparatus operates as a thickener in which the particles are unloaded from the buckets exteriorly of one side of the tank and carried away by a launder while the liquid in the tank overflows the tank at the opposite side thereof. In another embodiment, the apparatus operates as a classifier in which bed particles are dropped from the buckets into an adjoining tank and the overflow from the opposite side of the adjoining tank is directed back into the primary tank.

25 Claims, 5 Drawing Figures

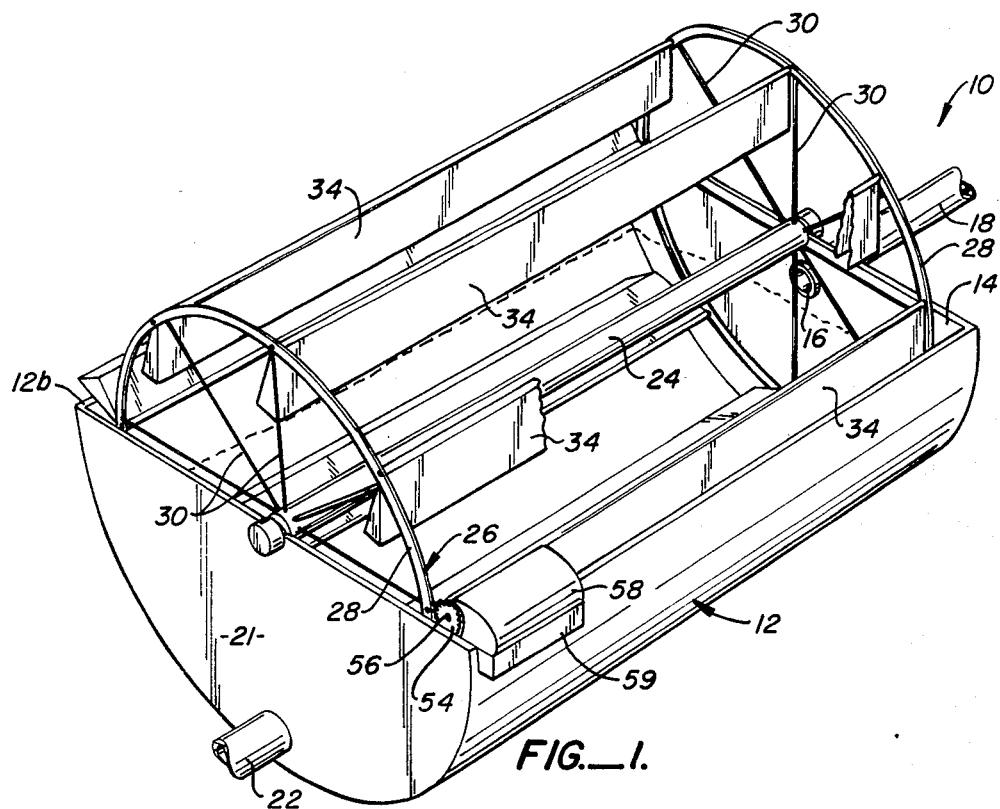
FIG._1.
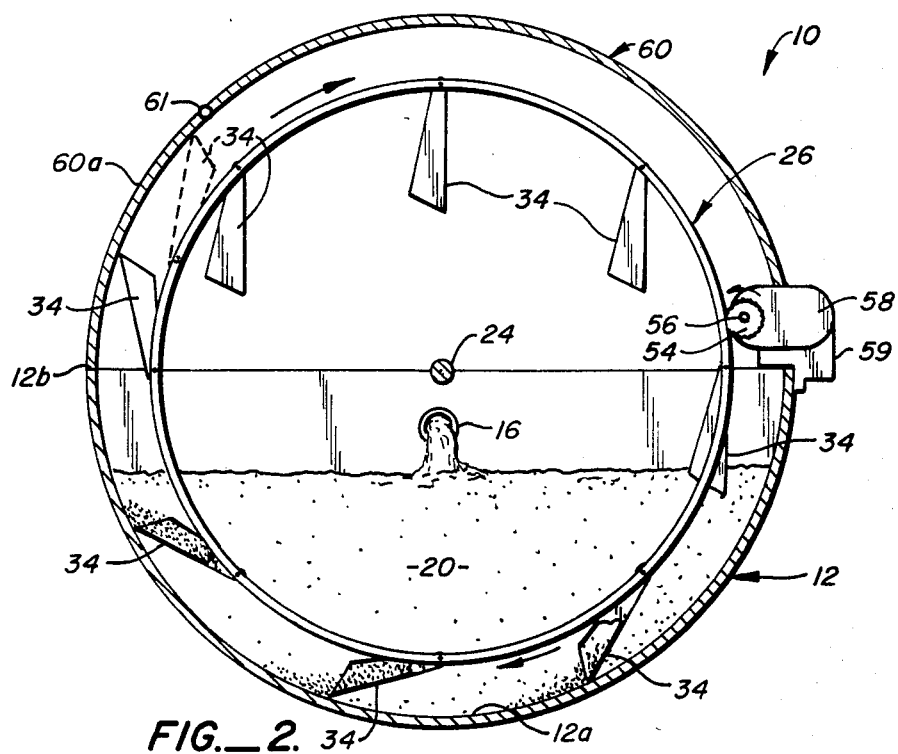
FIG._2.

U.S. Patent  Nov. 12, 1985  Sheet 2 of 2  4,552,460
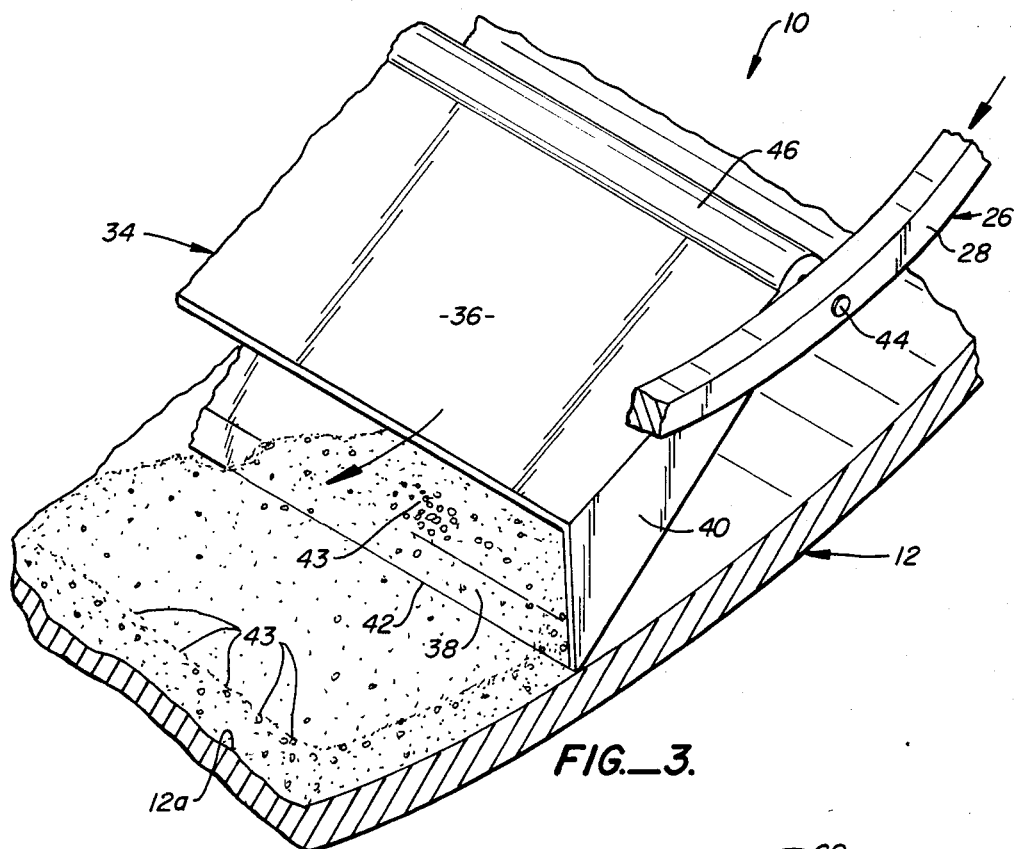
FIG._3.
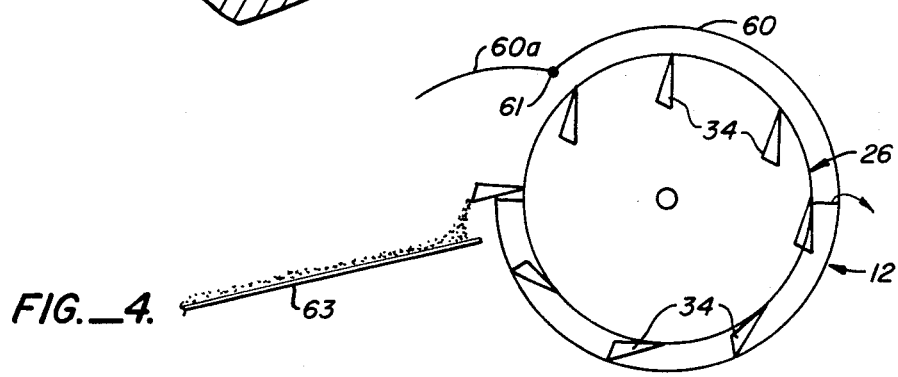
FIG._4.
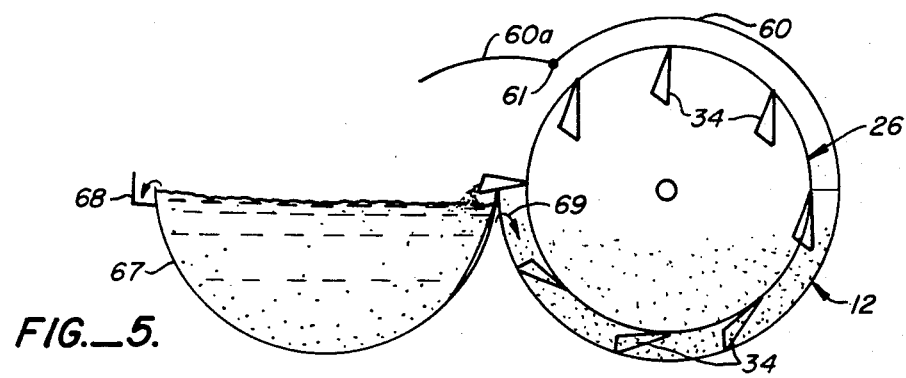
FIG._5.

BUCKET-LIFT SLURRY STORAGE APPARATUS AND METHOD

This invention relates to improvements in the handling of slurries, such as coal slurries, like, and more particularly, to an apparatus and method of maintaining active slurry storage in an efficient manner.

BACKGROUND OF THE INVENTION

Slurries prepared for pipeline transportation generally must be maintained in an agitated state during temporary storage. Otherwise, the particles in the slurries will settle out and be difficult to put back into suspension in the slurry carrier. Ideally, the means for agitating the slurry should produce and maintain a uniform particle concentration and particle size consist through the volume of slurry contained in the tank. The concentration and consist should at least be stable and predictable at the point of discharge from the storage tank; otherwise, upset conditions could occur in the pipeline transporting the slurry.

The current practice in active slurry storage makes use of a storage tank in the shape of a right circular cylinder. A propeller like paddle is located near the tank bottom and is rotated about a vertical axis in a horizontal plane, the axis of rotation generally being coincident with the axis of the cylindrical tank. In large tanks, two paddles on the same shaft are needed to develop sufficient agitation force. Vertical baffles are usually attached to the cylinder walls to provide for vertical motion of the slurry rather than horizontal motion.

The flow induced in the agitated slurry in a conventional apparatus is toroidal with the axis of the toroid being coincident with the axis of the storage tank. A large amount of power is required to establish and maintain this motion not only because the solids and the slurry carrier are circulated but also because the particles are lifted by fluid entrainment. Thus, a high flow velocity is developed to entrain the particles and carry them to a location near the top of the slurry in the tank. Having reached the upper ends of their paths of travel, the particles are immediately carried downwardly by the same entrainment flow to repeat the cycle. This is an undesirable feature because of the power requirements and a need exists for improvements in the handling of coal and other particle slurries in active slurry storage situations to avoid or minimize this problem.

Representative disclosures in the field of slurry storage tanks include U.S. Pat. Nos. 4,332,484 and 4,367,048.

SUMMARY OF THE INVENTION

The present invention satisfies the aforesaid need by providing apparatus and a method for maintaining active slurry storage in a manner to maintain slurry solids in suspension in a slurry carrier in a tank with much less power expenditure than typically required in the current practice of storage tank agitation. A primary objective in the operation of the present invention is to eliminate the growth of a settled bed of particles in a generally continuous manner so as to obtain uniform particle concentration and size consist throughout the slurry stored in the tank.

The primary object of the present invention is to provide an improved apparatus and a method for active slurry storage in a tank whereby the particles in the slurry are kept agitated while power requirements are kept to a minimum, while eliminating the growth of a bed of settled particles in the tank, and while keeping the particle concentrations and particle size consist substantially uniform throughout the slurry stored in the tank.

Other objects of this invention will become apparent as the following specification progresses, reference being had to the accompanying drawings for an illustration of the invention.

IN THE DRAWINGS

FIG. 1 is a perspective view, partly broken away to show the bucket lift slurry storage apparatus of the present invention;

FIG. 2 is a vertical section through the apparatus of FIG. 1;

FIG. 3 is an enlarged, fragmentary, perspective view of the apparatus of FIGS. 1 and 2, showing the way in which one of the buckets scoops settled particles from the bottom of the tank;

FIG. 4 is a schematic view of the apparatus when used as a thickener; and

FIG. 5 is a view similar to FIG. 4 but showing the apparatus when used as a classifier.

A first embodiment of the bucket lift slurry storage apparatus of the present invention is broadly denoted by the numeral 10 and includes a tank 12 which is a right circular cylinder with a horizontal axis. It is shown with an open top which may be closed and filled with an inert gas if oxygen entrainment is to be avoided. One end wall 14 is provided with a fluid inlet 16 coupled to a pipe 18, whereby a slurry can be fed into the tank from a suitable source, such as a coal slurry pipeline or the like. FIG. 2 shows a flow of a slurry into tank 12 through inlet 16 thereof to provide a volume of slurry 20 in the tank. The opposite end wall 21 of tank 12 has a fluid outlet coupled to a pipe 22 which is coupled to a suitable collector, such as the same slurry pipeline coupled with inlet pipe 18.

The incoming slurry is comprised of a liquid carrier and solid particles in suspension. The primary objective of apparatus 10 is to actively store the slurry, such as for temporary storage purposes as well as to eliminate the growth of a settled bed of particles in the bottom 12a of tank 12. Apparatus 10 operates to achieve this objective in a continuous manner such that there will be uniform particle concentrations and size consist throughout the interior of slurry 20.

Tank 12 has a shaft 24 journalled at its ends on the upper marginal edges of end walls 14 and 21. Suitable bearings (not shown) are provided for rotatably mounting the shaft on the end walls. An open cylindrical frame work 26 is secured to and rotates with shaft 24, the framework being of any suitable construction. However, for purposes of illustration, framework 26 includes a pair of rings 28 which are secured by radial spokes or rods 30 to respective ends of shaft 24 so that rings 28 are generally concentric with shaft 24 and rotate therewith relative to tank 12 in one direction, namely the direction of arrow 32 (FIG. 2).

A plurality of buckets 34 are carried by framework 26 and extend between and are pivotally mounted on rings 28. These buckets operate to scoop particles which have settled on the bottom of tank 12, then to lift the particles upwardly, and eventually to drop the particles back into the tank. Thus, the buckets operate to eliminate the growth of a settled bed of particles on the bottom of tank 12, and this is done in a generally continuous manner inasmuch as the buckets are continuously moving relative to the tank under the influence of a drive motor as hereinafter described.

Each bucket 34 has a pair of sides 36 and 38 (FIG. 3) and a pair of ends 40, only one of which is shown in FIG. 3. For purposes of illustration, ends 40 are generally triangular in shape and the sides 36 and 38 are generally rectangular but the ends and sides could be of other shapes so long as they form an open front end 42 for the bucket, whereby the bucket can receive settled particles in the manner shown in FIG. 3. A pin 44 pivotally mounts the end portion 46 of the bucket on rings 28, the pin 44 extending between and coupled with rings 28 pins. The bucket is freely pivotal relative to framework 26.

The length of each bucket 34 is substantially equal to the axial length of tank 12. This assures that substantially all of the settled particles 43 on the bottom of the tank will be scooped up by a bucket 34 as the bucket passes along said bottom.

Means is provided for rotating framework 26 generally continuously relative to tank 12. For purposes of illustration, this moving means comprises a wheel 54 mounted on the drive shaft 56 of a drive motor 58 carried by a bracket 59 on the upper side margin of tank 12 in the manner shown in FIGS. 1 and 2. Wheel 54 is in functional engagement with one of rings 28. The motor is connected by leads (not shown) to a source of electrical power, and actuation of the motor causes wheel 54 to rotate the adjacent ring 28 and thereby framework 26 about the central axis of shaft 24 in the direction of arrow 32 (FIG. 2). Other means may be provided for this purpose, if desired.

As each bucket 34 approaches the lower end of its path of travel in tank 12, the settled particles 43 on tank bottom 12a are scooped in the bucket as shown in FIG. 3. The bucket eventually rises and successively occupies the various bucket locations shown in FIG. 2. After the bucket moves past the adjacent upper side margin 12b of tank 12 (FIG. 2) the bucket engages a guide bar 60 while the bucket still contains a mass of particles 43 scooped from tank bottom 12a. Guide bar 60 progressively pivots the bucket such that, when the bucket reaches the dashed line position shown in FIG. 2, its center of gravity is to the right of the vertical plane passing through the bucket pivot axis. When this occurs, the bucket pivots in a clockwise sense when viewing FIG. 2 and the contents of the bucket will be dumped into the slurry 20 in tank 12. The customarily slow rotation of the slurry established by the movement of the buckets helps in the lateral distribution of the sediment dumped into the tank.

The shape and location of the guide bar 60 can be selected such that the emptying of the bucket can occur at any location to the left of center along guide bar 60.

Since the framework 26 is continuously moving under the influence of drive motor 58, one bucket 34 after another will scoop the bottom 12a of the tank 12 and lift settled particles so that the particles will be dropped back into the slurry 20 in the tank when the bucket reaches the location at which the center of gravity of the loaded bucket is out of the vertical plane passing through its pivot point.

The speed of rotation of framework 26 and thereby buckets 34 is established by the rate of bed growth characteristic of the slurry. For example, take Black Mesa coal of pipeline consist where:

$\phi_s$ = slurry volume concentration of solids in the slurry
= 39%

$\phi_m$ = volume concentration of solids in the settled bed
= 45%

$U$ = mean settlement velocity of the coal solids
= 4.86 × 10$^{-4}$ cm/sec.

$v$ = velocity of bed growth.

then, $\phi_s U = \phi_m V$ and from the above data, $V = 4.25 \times 10^{-4}$ cm/sec = $1.39 \times 10^{-5}$ ft/sec.

Assume the tank diameter to be 40 ft. The rate of bed growth per foot of tank length is:

40 ft × 1.39 × 10$^{-5}$ ft/sec = 5.56 × 10$^{-4}$ ft$^3$/sec per ft. of length.

Assume each triangular bucket has a width of 4" ($\frac{1}{3}$ ft) at the open end 42 and a length of 3 ft from the open end to the pivot axis of the bucket. The volume per foot of bucket length is:

$\frac{1}{2} \times 3 \times \frac{1}{3} = 0.5$ ft$^3$ per foot.

If there are N buckets and w is the angular velocity of the wheel, then:

bucket volume × no. of buckets × angular velocity = rate of bed growth, or $0.5 \times N \times w = 5.56 \times 10^{-4}$ ft$^3$/ft sec.

Let N=8 as shown in FIG. 2. Then W=0.5 revolutions/hr. Thus, a bucket empties every 15 minutes.

Power required to maintain continuous rotation of framework 26 will be very small. Power losses are mostly attributable to:
1. Drive train friction
2. Maintaining the laminar rotational motion in the slurry 20 in tank 12
3. Unbalanced moment of the loaded buckets.

Torque requirements are at a maximum during startup and until the rotation of the bucket wheel establishes steady-state rotation of the slurry. When new slurry enters tank 12, it will diffuse into the rotating slurry mass 20. This will require additional power from the bucket wheel drive. The slurry inlet 16 should be located at one end of the tank at the null point of the rotational velocity field of the full tank. The outlet can be located at the other end of the tank, as low as possible in the tank without entraining settled bed material into the outflow. If the splashback of bed material from the buckets into the tank entrains too much oxygen from the air, a plastic cover can be put over the tank and the dead space can be filled with nitrogen.

Apparatus 10 can be used as a thickener (FIG. 2) or as a classifier in FIG. 3. In either case, guide bar 60 has a short section 60a which is pivoted by a pin 61 on the remainder of the guide bar so that segment 60a can pivot upwardly and away from the path of the buckets 34. When this occurs, the buckets do not engage the guide bar after passing the adjacent upper margin 12b of tank 12; thus, the buckets do not empty into tank 12 but empty outside the tank as shown in FIGS. 4 and 5. FIG. 4 shows bed material deposited on an inclined launder 63 while the liquid or supernatant overflows the tank as indicated by arrow 65.

In classifying operations as shown in FIG. 5, a separate tank 67 is located directly adjacent to tank 12, and bed material is dropped into tank 67 by the buckets since guide bar segments 60a is in its elevated position as shown in FIG. 5. A trough 68 at the upper extremity of tank 67 surrounds this tank to receive the overflow therefrom. Tank 67 is sufficiently close to tank 12 such that the overflow from trough 68 is routed back into tank 12 through a hole in trough 68 as indicated by the arrow 69.

What is claimed is:

1. A slurry handling apparatus comprising: a tank having a fluid inlet and a fluid outlet, whereby a slurry containing particles in suspension can be directed into and out of the tank; a plurality of buckets; means coupled with the tank for mounting the buckets on the tank for movement along a path extending into the tank and into proximity to the bottom of the tank to allow the buckets to scoop slurry particles settled in the tank off the bottom and in an upward direction, the buckets being pivotal relative to the tank; means adjacent to said path for pivoting the buckets to cause the buckets to deposit the particles scooped thereby back into the tank; and means coupled with said bucket mounting means for moving the buckets along said path as a function of the rate at which particles gravitate toward said bottom.

2. Apparatus as set forth in claim 1, wherein the pivoting means includes a guide bar.

3. Apparatus as set forth in claim 1, wherein the pivoting means is operable to allow the buckets to empty the particles therein exteriorly of the tank.

4. Apparatus as set forth in claim 3, wherein is included a launder exteriorly of the tank and located to receive the particles discharged from the buckets.

5. Apparatus as set forth in claim 4, wherein the launder is inclined and has its upper end spaced below the location on the tank at which particles are discharged therefrom.

6. Apparatus as set forth in claim 3, wherein is included a second tank adjacent to the first-mentioned tank, and in position to receive particles discharged from the buckets.

7. Apparatus as set forth in claim 6, wherein the second tank is sufficiently close to the first tank to permit overflow of liquid from the second tank into the first tank.

8. Apparatus as set forth in claim 1, wherein the tank has an open top, each of the buckets being movable through and above the open top of the tank, said pivoting means including a curved guide bar extending upwardly from said open top.

9. Apparatus as set forth in claim 1, wherein said mounting means comprises an open framework.

10. Apparatus as set forth in claim 9, wherein said open framework comprises a pair of spaced rings, a central shaft generally concentric to the rings, and means coupling the shaft to the rings.

11. Apparatus as set forth in claim 10, wherein the buckets are pivotally mounted to the rings and span the distance therebetween.

12. Apparatus as set forth in claim 11, wherein each bucket has an open end remote from the location at which it is pivotally mounted on the rings.

13. Apparatus as set forth in claim 12, wherein each bucket has a pair of sides, a pair of opposed ends, and an open front end.

14. Apparatus as set forth in claim 10, wherein said tank has a generally open top and a pair of opposed end walls, the shaft extending between and journalled on the upper margins of the end walls.

15. Apparatus as set forth in claim 1, wherein the tank is a right circular cylinder having an open top.

16. Apparatus as set forth in claim 1, wherein said moving means comprises a motor having a drive shaft, and means on the drive shaft of the motor and coupled to said bucket mounting means for rotating said bucket mounting means relative to said tank.

17. Apparatus as set forth in claim 16, wherein the motor is mounted on said tank and has a wheel on its drive shaft, said bucket mounting means including a rotatable ring said wheel functionally engaging said ring.

18. A method of storing a particle slurry with the particle substantially in suspension comprising: directing the slurry into a confined space in which some of the the particles have a tendency to gravitate toward the bottom of the space; lifting the particles near the bottom of the space as a function of the rate at which particles gravitate toward said bottom; depositing the particles back into the slurry in the space after the particles have been lifted; and repeating the lifting and depositing steps in a generally continuous manner and at a rate to avoid the growth of a settled bed of particles on said bottom and to obtain and maintain uniform particles concentration and size consist throughout the slurry.

19. A method as set forth in claim 18, wherein said lifting step is performed while substantially maintaining uniform particle concentrations and size consist substantially throughout the slurry.

20. A method as set forth in claim 19, wherein said lifting step includes successively scooping the settled bed particles upwardly of the bottom of the space in incremental scoops.

21. A slurry handling apparatus comprising: a tank having an open top, a fluid inlet and a fluid outlet, whereby a slurry containing particles in suspension can be directed into and out of the tank; a plurality of buckets; means for mounting the buckets on the tank for movement along a generally continuous path with each bucket being movable along a path extending into the slurry and in proximity to the bottom of the tank to scoop slurry particles settled in the tank off the bottom and in an upward direction; a guide bar extending upwardly from the top adjacent to said path of the buckets, the guide bar being engageable by the buckets for tilting the buckets as they move along said path, the buckets being operable to deposit the particles at a predetermined location with respect to the tank; and means coupled with said bucket mounting means of moving the buckets along said path.

22. Apparatus as set forth in claim 21, wherein the guide bar has a main part and a secondary part pivotally mounted to the main part, the secondary part being adjacent to the upper margin of the tank for selectively engaging each bucket as it travels upwardly past said margin.

23. A method of handling a slurry containing particles in suspension comprising: directing the slurry into a confined space whereby at least some of the particles have a tendency to gravitate to the bottom of the space; lifting the particles from the bottom of the space as a function of the rate at which particles gravitate toward said bottom; and dropping the lifted particles outside of the space.

24. A method as set forth in claim 23, wherein is included the step of moving the discharged particles along an inclined path to a location remote from said space.

25. A method as set forth in claim 23, wherein said dropping step includes discharging the particles into a second confined space containing a liquid with the second space being sufficiently close to the first space to permit overflow of the liquid from the second space into the first space.

* * * * *